US012533828B2

(12) United States Patent
Hatanaka et al.

(10) Patent No.: US 12,533,828 B2
(45) Date of Patent: Jan. 27, 2026

(54) SMOOTHER AND GYPSUM BOARD MANUFACTURING DEVICE

(71) Applicant: YOSHINO GYPSUM CO., LTD., Tokyo (JP)

(72) Inventors: Takumi Hatanaka, Tokyo (JP); Seiji Tanikawa, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 28 days.

(21) Appl. No.: 18/682,667

(22) PCT Filed: Aug. 25, 2022

(86) PCT No.: PCT/JP2022/032064
§ 371 (c)(1),
(2) Date: Feb. 9, 2024

(87) PCT Pub. No.: WO2023/032810
PCT Pub. Date: Mar. 9, 2023

(65) Prior Publication Data
US 2024/0359360 A1    Oct. 31, 2024

(30) Foreign Application Priority Data
Aug. 31, 2021    (JP) .................................. 2021-140653

(51) Int. Cl.
*B28B 11/08*    (2006.01)
*B28B 5/02*    (2006.01)
*B28B 19/00*    (2006.01)

(52) U.S. Cl.
CPC .......... *B28B 11/0845* (2013.01); *B28B 5/027* (2013.01); *B28B 19/0092* (2013.01)

(58) Field of Classification Search
CPC .................................................. B28B 11/0845
See application file for complete search history.

(56) References Cited

U.S. PATENT DOCUMENTS 2,495,960 A * 1/1950 George ............... B28B 11/0845
425/219
3,782,534 A    1/1974 Holleman
(Continued)

FOREIGN PATENT DOCUMENTS

GB    618000    2/1949
JP    S51-097626    8/1976
(Continued)

OTHER PUBLICATIONS

Extended European search report mailed on Oct. 10, 2024 with respect to the corresponding patent application No. 22864394.6.
(Continued)

*Primary Examiner* — Scott W Dodds
(74) *Attorney, Agent, or Firm* — IPUSA, PLLC

(57) ABSTRACT

A smoother includes a conveying device for a molded body; a pair of arms that are respectively disposed to face both widthwise ends of the conveying device, and in which longitudinal ends of the arms are swingable in upward and downward directions with respect to a conveying surface of the conveying device; a smoother plate fixed to a pair of facing ends of the longitudinal ends of the pair of arms; weights that are respectively attached to the pair of arms and are movable along a longitudinal direction of the arms; a weight position changing device configured to change positions of the weights on the arms; and a first control device configured to control the positions of the weights on the arms via the weight position changing device.

6 Claims, 3 Drawing Sheets

(56) References Cited

U.S. PATENT DOCUMENTS

| | | | |
|---|---|---|---|
| 3,952,863 A | | 4/1976 | Schattauer |
| 2005/0159057 A1* | | 7/2005 | Hauber .................. B32B 13/14 |
| | | | 442/42 |
| 2018/0036909 A1 | | 2/2018 | Dubey et al. |
| 2018/0036912 A1 | | 2/2018 | Dubey et al. |

FOREIGN PATENT DOCUMENTS

| | | |
|---|---|---|
| JP | H02-239015 | 9/1990 |
| JP | H04-078502 | 3/1992 |
| JP | 2001-277222 | 10/2001 |
| JP | 2019-527636 | 10/2019 |
| JP | 2019-527638 | 10/2019 |
| WO | 2002/098646 | 12/2002 |

OTHER PUBLICATIONS

International Search Report for PCT/JP2022/032064 mailed on Oct. 4, 2022.
Written Opinion of the International Searching Authority for PCT/JP2022/032064 mailed on Oct. 4, 2022.
Office Action mailed on Sep. 1, 2025 with respect to the corresponding European patent application No. 22864394.6.

* cited by examiner

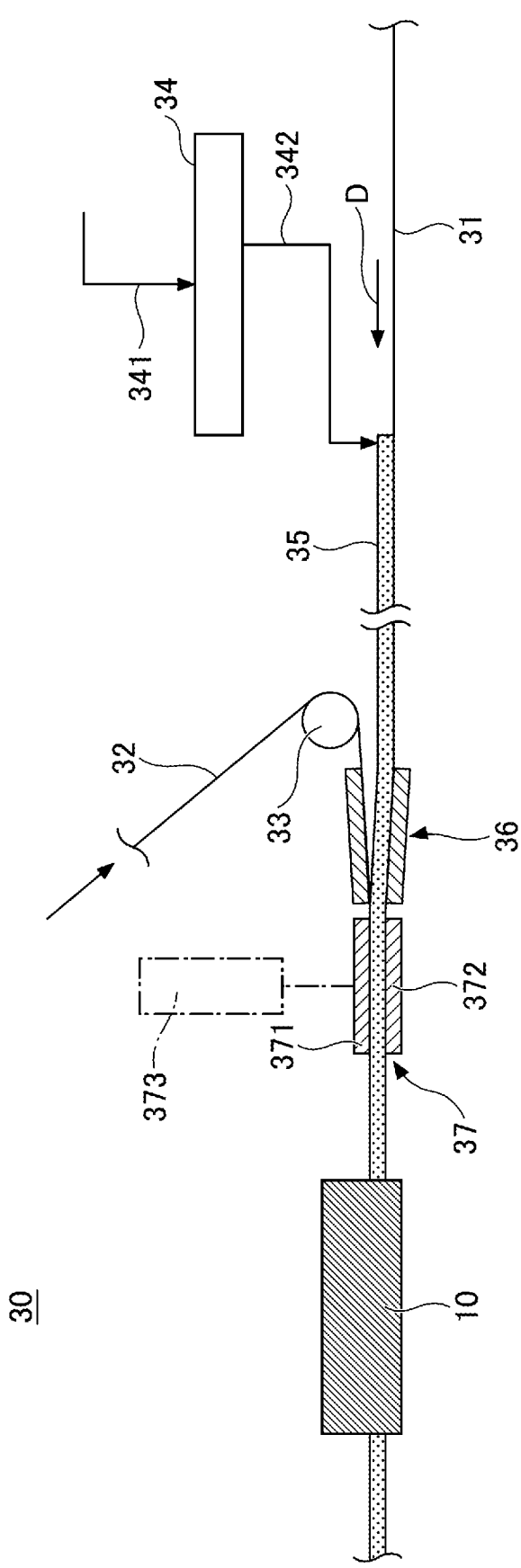

SMOOTHER AND GYPSUM BOARD MANUFACTURING DEVICE

TECHNICAL FIELD

The present invention relates to smoothers and gypsum board manufacturing devices.

BACKGROUND ART

Patent Literature 1 discloses a slurry molding device including: a movable belt configured to receive a continuously supplied uncured curable slurry on a moving surface thereof and convey the slurry; a first roller that is rotatable and provided on the movable belt, the first roller having a rotation shaft along a direction crossing a conveying direction of the movable belt; a second roller that is rotatable and provided downstream of the first roller in the conveying direction to face the first roller and have a desired gap from the moving surface, the second roller having a rotation shaft parallel to the rotation shaft of the first roller; and width-defining members provided at both lateral portions of the movable belt and configured to define the flow width of the curable slurry on the moving surface, in which the curable slurry is supplied between the first roller and the second roller from above thereof, the curable slurry is supplied onto the moving surface from between the first roller and the second roller while being expanded by the first roller and the second roller in the widthwise direction of the moving belt, and a plate-shaped molded body is molded to have a width that is defined by the width-defining members and a thickness that is defined by a gap between the moving surface and the second roller.

CITATION LIST

Patent Literature

Patent Literature 1: Japanese Laid-Open Patent Publication No. 2001-277222

SUMMARY OF INVENTION

Technical Problem

For example, as disclosed in Patent Literature 1, various slurries have been molded with molding machines to manufacture molded bodies.

The surfaces of plate-shaped molded bodies obtained by molding slurries with molding machines are approximately smooth. However, a part of the obtained molded bodies of slurries may have such a shape as to be slightly swollen along the thickness direction thereof compared to the intended shape in accordance with, for example, a manner in which the slurries are supplied in the molding machines. Also, during conveyance of the molded bodies after molding, the molded bodies are, for example, dried, and thereby the molded bodies may cause warpage or a part thereof may become swollen. Like in a gypsum board and the like, when manufacturing a molded body in which a cover member such as a board liner is disposed on the surface of a slurry, a portion in which the internal pressure becomes higher occurs due to, for example, bubbles included between the slurry and the cover member, and a part of the surface of the molded body may become swollen.

Therefore, in order to correct (remedy) such swelling, warpage, and the like of the molded body and increase smoothness of the surface thereof, a device called a smoother, which further levels and smooths the surface of the molded body after molding with a molding machine, has been used.

In order to smooth the surface of the molded body or the like with the smoother, it is necessary to press and level the surface of the molded body while applying a load, which is appropriate for smoothing the surface of the molded body, to the molded body with a smoother plate. To do this, a glass plate having a sufficient weight may be used as the smoother plate that contacts the molded body.

However, a load necessary for smoothing the surface of the molded body varies with the type or size of the molded body to manufacture. The glass plate used as the smoother plate has a predetermined weight, which is unchangeable. Thus, for example, there has been a need to previously provide a plurality of smoother plates having different weights and use a smoother plate having an appropriate weight every time the product type or the like of the molded body to manufacture has been changed. In view thereof, from the viewpoint of increasing manufacturing efficiency, it has been desired to provide a smoother that can readily change a load to apply to the molded body without the need for cumbersome work of changing the smoother plate.

In one aspect of the present invention in view of the problems in the art, it is an object to provide a smoother that can readily change a load to apply to the molded body.

Solution to Problem

According to one aspect for solving the above-described problems, a smoother including the following is provided:
a conveying device for a molded body;
a pair of arms that are respectively disposed to face both widthwise ends of the conveying device, and in which longitudinal ends of the arms are swingable in upward and downward directions with respect to a conveying surface of the conveying device;
a smoother plate fixed to a pair of facing ends of the longitudinal ends of the pair of arms;
weights that are respectively attached to the pair of arms and are movable along a longitudinal direction of the arms;
a weight position changing device configured to change positions of the weights on the arms; and
a first control device configured to control the positions of the weights on the arms via the weight position changing device.

Advantageous Effects of Invention

According to one aspect of the present invention, it is possible to provide a smoother that can readily change a load to apply to a molded body.

BRIEF DESCRIPTION OF DRAWINGS

FIG. 3 is an explanatory view of a gypsum board manufacturing device according to one aspect of the present disclosure.

DESCRIPTION OF EMBODIMENTS

In the following, embodiments of the present invention will be described with reference to the drawings. However, the present invention is not limited to the following embodiments, and various modifications and substitutions can be added thereto without departing from the scope of the present invention.

[Smoother]

One configuration example of the smoother according to the present embodiment will be described. Note that, for example, as illustrated in a gypsum board manufacturing device 30 of FIG. 3 as described below, the smoother of the present embodiment is a device configured to level and smooth the surface of, for example, a molded body that is molded with a molding machine 37, and thus may also be called a smoothing device or the like.

The molding machine is a device configured to mold an amorphous slurry into a predetermined shape, while the smoother of the present embodiment is a device configured to correct the shape of the molded body obtained by molding the slurry with the molding machine, specifically, for example, a device configured to smooth the surface of the molded body as described above. Therefore, the smoother of the present embodiment can be disposed downstream of the molding machine in a conveying direction of the molded body, and can perform final shaping of the molded body.

The smoother of the present embodiment is a smoother configured to smooth the surface of the molded body that is being conveyed by the conveying device. The smoother of the present embodiment can include the following conveying device, arms, smoother plate, weights, weight position changing device, and first control device.

Figure 1:
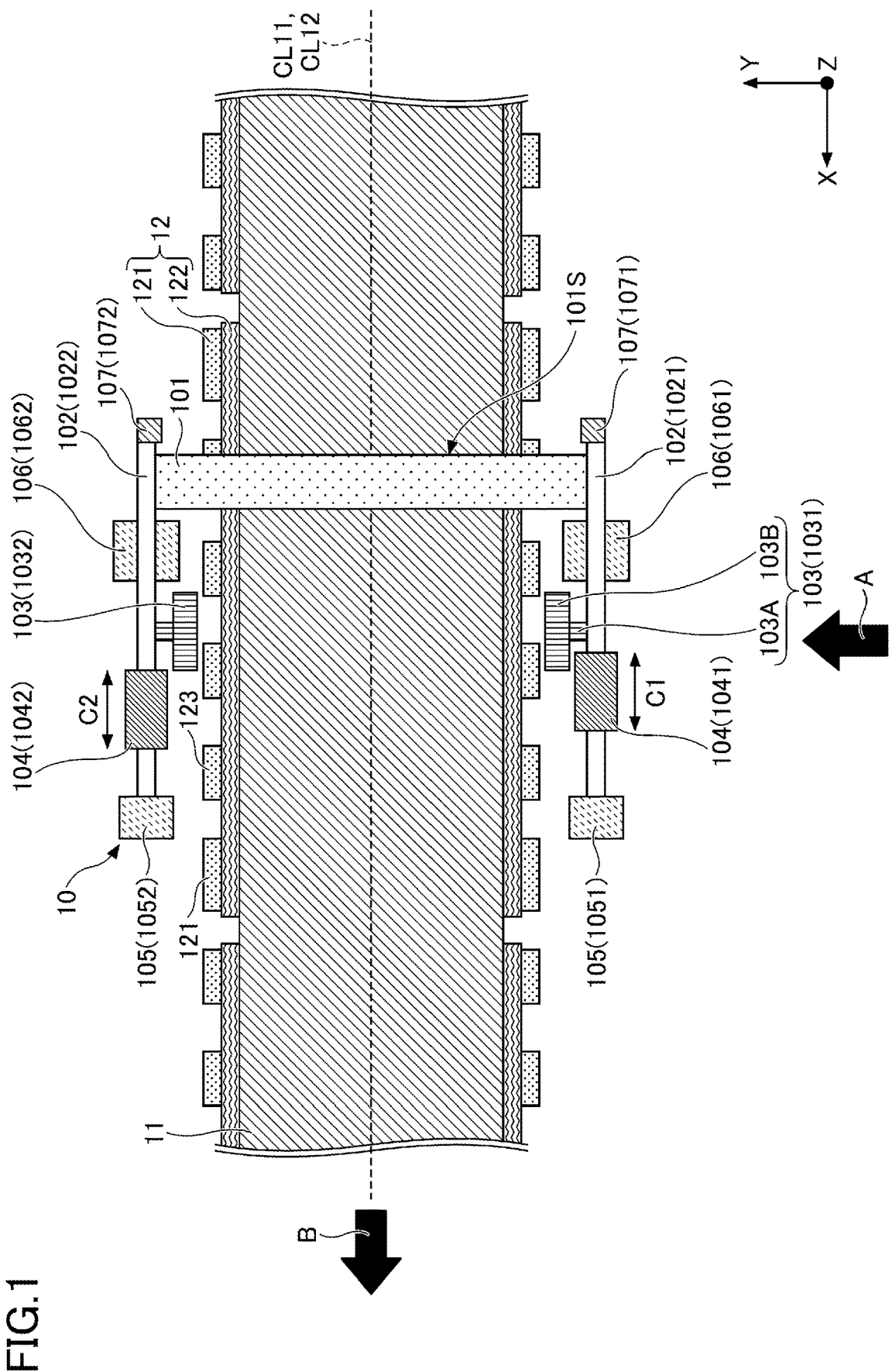
FIG. 1 is an explanatory view of a smoother according to one aspect of the present disclosure.
Figure 2:
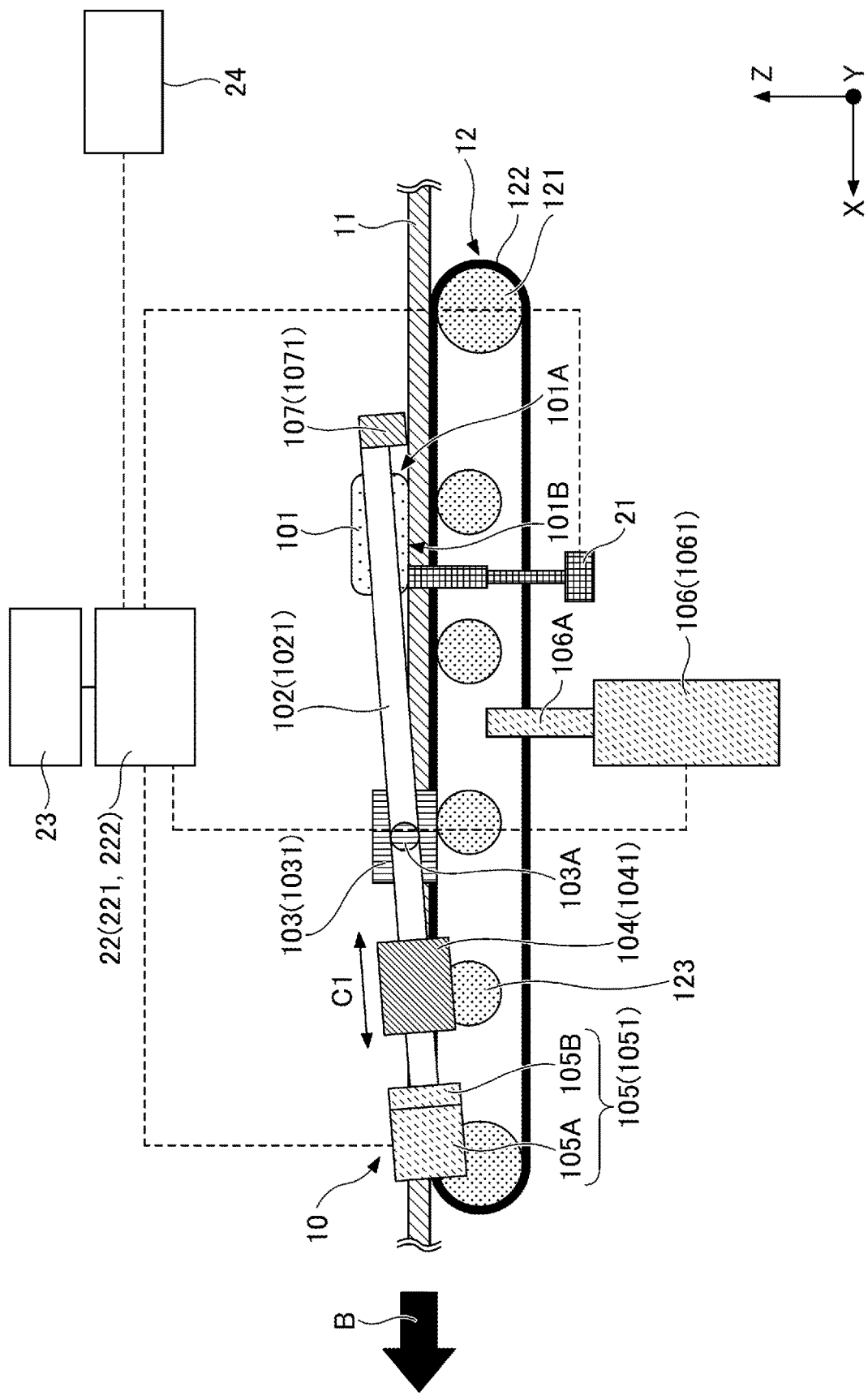
FIG. 2 is a lateral view of the smoother illustrated in FIG. 1.

A configuration example of the smoother of the present embodiment will be described with reference to FIG. 1 and FIG. 2. FIG. 1 is a top view of a smoother 10 of the present embodiment. FIG. 2 is a lateral view of the smoother illustrated in FIG. 1, as viewed along a block arrow A. Note that, FIG. 1 and FIG. 2 also illustrate given members that can be included in the smoother of the present embodiment; however, such an embodiment is by no means a limitation. Also, FIG. 1 omits illustration of various control devices as illustrated in FIG. 2, and description of connection wires between the control devices and the respective members. For the sake of convenience of illustration, FIG. 2 only illustrates connection wires between a control device 22 and respective members on an arm 1021 (one arm) side. However, similarly, the connection wires can be disposed between the control device 22 and a weight position changing device 1052, a smoother plate position changing device 1062, and the like on the other arm 1022 side.

In FIG. 1 and FIG. 2, an X axis is a conveying direction of a molded body 11, a Y axis is a widthwise direction of the molded body 11 or a conveying device 12, and a Z axis is a thickness direction of the molded body 11 and is a height direction (upward and downward directions) of the smoother 10 and the like. Note that, a direction along the Z axis may be referred to as upward and downward directions with respect to the conveying surface of the conveying device 12.

In FIG. 1 and FIG. 2, the molded body 11 is conveyed by the conveying device 12 along the X-axis direction, i.e., along a block arrow B, from the right-hand side to the left-hand side in the drawings. FIG. 1 and FIG. 2 illustrate that the surface of the molded body 11 that is being conveyed is smoothed by the smoother 10 of the present embodiment.

In the following, the members included in the smoother of the present embodiment will be described.

(1) Regarding Smoother (1-1) Conveying Device

The smoother 10 of the present embodiment can include the conveying device 12 for the molded body 11. FIG. 1 and FIG. 2 illustrate, as an example of the conveying device 12, a belt conveyor in which a belt 122 is wound around a pair of pulleys 121, and rollers 123 are disposed between the pair of pulleys 121 so as to support the molded body 11 and the like. However, the conveying device 12 is not limited to the above configuration as long as the conveying device 12 is a device configured to support and convey the molded body 11.

As the conveying device 12, for example, one or more selected from a belt conveyor, a roller conveyor, a chain conveyor, and the like can be used. Note that, the conveying device 12 can also include two or more types of conveying devices, for example, a belt conveyor and a roller conveyor.

A surface of the conveying device 12 that places the molded body 11 thereon is the conveying surface of the conveying device 12.

(1-2) Arm, Supporting Shaft

The smoother 10 of the present embodiment can include a pair of arms 102. The arms 102 are respectively disposed to face both widthwise ends of the molded body 11 or the conveying device 12.

That is, the smoother 10 of the present embodiment can include two arms 102, i.e., the arm 1021 and the arm 1022.

No particular limitation is imposed on the shape of the arms 102, but the arms 102 can have a rod shape, a columnar shape, or the like. However, such shapes as a rod shape and a columnar shape do not mean geometrically strict shapes, and may undergo deformation that is necessary for disposing the below-described weight and the like.

Note that, the arms 102 are preferably disposed to be apart by predetermined distances from the widthwise ends of the conveying device 12 so as not to interfere with the conveying device 12 that conveys the molded body 11.

The arms 102 can be configured so that the longitudinal ends thereof are swingable in upward and downward directions with respect to the conveying surface of the conveying device 12. That is, the longitudinal ends of the arms 102 can be configured so as to be swingable (movable) along the Z axis in FIG. 1 and FIG. 2.

No particular limitation is imposed on the configuration in which the longitudinal ends of the arms 102 are swingable. However, for example, the smoother 10 can include a supporting shaft 103A connected to the arm 102.

As described above, when the supporting shaft 103A is connected to the arm 102, the arm 102 can be configured so that both longitudinal ends of the arm 102 are swingable, i.e., movable, in upward and downward directions around the supporting shaft 103A serving as a fulcrum (rotation axis). For example, in FIG. 2, when the arm 102 is rotated clockwise around the supporting shaft 103A serving as a fulcrum, a smoother plate 101 as described below can be moved downward so as to contact and press the smoother plate 101 with and against the surface of the molded body 11. At this time, by adjusting a force to rotate clockwise, in other words, a force of the smoother plate 101 to press downward, it is possible to adjust a load to apply to the surface of the molded body 11.

Also, when the arm 102 is rotated counterclockwise around the supporting shaft 103A serving as a fulcrum, the smoother plate 101 is moved upward, and a load applied by the smoother plate 101 to the molded body 11 is reduced. Moreover, the smoother plate 101 can be moved away from the molded body 11.

The supporting shaft 103A can be provided horizontally and so as to be orthogonal to the conveying direction of the molded body 11. An end of the supporting shaft 103A that is not connected to the arm 102 may be connected to a bearing 103B. Alternatively, the supporting shaft 103A and the bearing 103B may form a supporting device 103.

As illustrated in FIG. 1, the supporting device 103 can be provided to face both widthwise ends of the molded body 11 or the conveying device 12. Therefore, the smoother 10 can include a supporting device 1031 and a supporting device 1032. Note that, the supporting device 1032 can also include a supporting shaft and a bearing.

(1-3) Smoother Plate

The smoother plate 101 is a member configured to contact the surface of the molded body 11, and level and smooth the surface of the molded body 11. The smoother plate 101 can horizontally contact and press the surface of the molded body 11 such as a gypsum board.

No particular limitation is imposed on the shape of the smoother plate 101 as long as the smoother plate 101 is a plate-shaped body.

However, in order not to damage the surface of the molded body 11 that is being conveyed, a corner 101A (see FIG. 2) is preferably chamfered, the corner 101A being upstream in the conveying direction of the molded body 11 and being located closer to a molded body 11—facing surface of the smoother plate 101 as viewed from a lateral surface thereof. That is, when the smoother plate 101 is viewed from the lateral surface thereof, the corner 101A preferably forms a curve that projects outward.

Also, a bottom surface 101B of the smoother plate 101, i.e., a surface thereof facing the molded body 11, is preferably a flat surface because the bottom surface 101B is a surface that levels and smooths the top surface of the molded body 11. When the smoother plate 101 is viewed from the lateral surface thereof, a portion corresponding to the bottom surface 101B can be, for example, a straight-line shape.

The smoother plate 101 can be fixed to and supported by the arms 102 at a given position on the arms 102. However, as illustrated in FIG. 1 and FIG. 2, the smoother plate 101 is preferably fixed to and supported by a pair of facing ends of the longitudinal ends of the arms 102. As described above, both longitudinal ends of the arms 102 are swingable in upward and downward directions. Thus, by fixing the smoother plate 101 to the pair of facing ends of the longitudinal ends of the arms 102, it is possible to swing the smoother plate 101 upward and downward in accordance with movements of the arms 102. That is, the smoother plate 101 is fixed to the pair of arms 102, and can be configured so as to be swingable upward and downward around the above-described supporting shaft 103A serving as a fulcrum.

No particular limitation is imposed on the material of the smoother plate 101 as long as the material thereof can smooth the surface of the molded body 11. The material of the smoother plate 101 may be, for example, glass, various metals, or various resins.

Note that, in order to prevent downward escape of the load applied to the molded body 11 when the molded body 11 is pressed and smoothed by the smoother plate 101, a member configured to support the load is preferably disposed below a disposition place of the smoother plate 101 so as to sandwich the molded body 11 therebetween. FIG. 1 and FIG. 2 illustrate an example in which the belt 122 of the conveying device 12 is disposed as the member configured to support the load, and more preferably the rollers are disposed under the belt 122. However, such an example is by no means a limitation. As the member configured to support the load, the rollers of the conveying device, an unillustrated supporting plate, or the like can also be provided.

(1-4) Weight

Weights 104 are respectively attached to the pair of arms 102, and are movable along the longitudinal direction of the arms 102.

The weight 104 may be attached to each of the arms 102, and can be configured to be movable along the longitudinal direction of the arm 102 as described above, i.e., along a two-headed arrow C1 or C2 in FIG. 1 and FIG. 2.

As described above, each of the arms 102 can be provided with the weight 104, and as illustrated in FIG. 1, the arm 1021 can be provided with a weight 1041 and the arm 1022 can be provided with a weight 1042.

The weight 104 is preferably disposed at a moving device previously provided to the arm 102, such as a linear rail, a linear shaft, a belt, or the like, so as to be readily movable along the longitudinal direction of the arm 102 by a weight position changing device 105 as described below.

No particular limitation is imposed on the weight, material, and the like of the weight 104, which can be selected in accordance with the type of the molded body 11 to manufacture, the required range of the load, and the like.

As described above, for example, the smoother plate 101 is configured to be swingable upward and downward around the supporting shaft 103A serving as a fulcrum. By moving the weights 104 disposed on the arms 102 in the longitudinal direction of the arms 102, it is possible to change the load applied to the molded body 11 via the smoother plate 101 supported by the arms 102. Therefore, according to the smoother 10 of the present embodiment, by changing the positions of the weights 104 on the arms 102, it is possible to readily change the load to apply to the molded body 11.

(1-5) Weight Position Changing Device

The weight position changing device 105 can change the position of the weight 104 on the arm 102.

No particular limitation is imposed on the configuration of the weight position changing device 105 as long as the weight position changing device 105 may be a device configured to slide the position of the weight along the longitudinal direction of the arm 102, i.e., along the two-headed arrow C1 or C2 in FIG. 1 and FIG. 2. The weight position changing device 105 can include a driving device 105A such as a linear motor, a motor, or the like.

As illustrated in FIG. 2, the weight position changing device 105 can include an encoder 105B configured to detect the position of the weight 104, in addition to the driving device 105A such as the linear motor.

The weight position changing device 105 may be provided to each of the arms 102. As illustrated in FIG. 1, the arm 1021 can be provided with a weight position changing device 1051 and the arm 1022 can be provided with the weight position changing device 1052.

(1-6) First Control Device, Storage Device

A first control device 221 (see FIG. 2) can control the position of the weight 104 on the arm 102 via the weight position changing device 105.

No particular limitation is imposed on control of the first control device 221, which may be, for example, configured to control the position of the weight 104 on the arm 102 based on conditions and values input from an input-output device 24 (see FIG. 2) connected to the first control device 221.

Also, the smoother 10 of the present embodiment can further include a storage device 23. In this case, the first control device 221 can also control the position of the weight 104 on the arm 102 based on control conditions in accordance with the type of the molded body 11 stored in the storage device 23.

Specifically, for example, in accordance with the product type of the molded body 11 input from the input-output device 24, the first control device 221 loads control conditions from the storage device 23, and can control the position of the weight 104 on the arm 102. That is, based on a recipe that is control conditions predetermined in accordance with the product type of the molded body 11, it is possible to control the position of the weight 104 on the arm 102.

In this way, by controlling the position of the weight 104 on the arm 102 based on the control conditions in accordance with the type of the molded body 11 to manufacture, it is possible to manufacture the molded body 11 having a stable quality regardless of an operator. Also, by loading the control conditions from the storage device 23, it is possible to readily change the type of the molded body 11 to manufacture. Thus, it is possible to perform switching of the type (product type) of the molded body 11 to manufacture in a short time.

Note that, suitable control conditions may change in accordance with weather, ambient temperature, or the like. Therefore, even if the position of the weight 104 on the arm 102 is controlled under the control conditions predetermined in accordance with the product type of the molded body 11, the position of the weight 104 on the arm 102 may be configured to be further controllable based on, for example, conditions input from the input-output device 24.

For example, in accordance with the type and the sizes (e.g., the width) of the molded body to manufacture, an appropriate load to apply to the molded body by the smoother plate changes. For example, when an excessive load is applied, there is a risk that the surface of the molded body 11 is damaged, while when an insufficient load is applied, there is a risk that the surface of the molded body cannot be sufficiently smoothed. Especially for existing smoothers, when the width of a smoother plate thereof is large compared to a molded body to manufacture, there is a risk that an excessive load is applied to the molded body. Therefore, hitherto, there has been a need to use a smoother having a width and a weight that respond to the width of the molded body to manufacture. It is sometimes difficult for a single smoother to respond to molded bodies having different widths.

However, according to the smoother 10 of the present embodiment, as described above, it is possible to change the position of the weight 104 on the arm 102 by the weight position changing device 105, the first control device 221, and the like, and to readily change the load to apply to the molded body 11 by the smoother plate 101. That is, the smoother 10 of the present embodiment is a smoother that is variable in the load to apply. Therefore, for example, even in the case of manufacturing product types of the molded body 11 to manufacture that are different in sizes such as a width thereof, only by changing the position of the weight 104, the load to apply to the molded body 11 by the smoother plate 101 is changed, and an appropriate load can be applied to the molded body 11. Therefore, compared to the existing smoothers, the smoother 10 of the present embodiment can be applied to a larger number of types of molded bodies in terms of sizes (e.g., a width), product types, and the like, and can increase manufacturing efficiency.

As described above, the smoother 10 of the present embodiment includes the pair of arms 102, i.e., the arm 1021 and the arm 1022. The arm 1021 is provided with the weight 1041 and the arm 1022 is provided with the weight 1042. Therefore, the first control device 221 can also control the weight 1041 and the weight 1042 independently of each other. That is, the first control device 221 may individually control the positions of the weight 1041 and the weight 1042 in the longitudinal direction of the arms 102.

As illustrated in FIG. 1, the smoother plate 101 has a shape that is longer in a widthwise direction of the molded body 11, i.e., in the Y-axis direction. FIG. 1 illustrates a case in which a center line CL11 of the molded body 11 in the widthwise direction thereof and a center line CL12 of the conveying device 12 in the widthwise direction thereof coincide with each other. However, in accordance with the molded body 11 to manufacture, the center line CL11 and the center line CL12 may be different from each other. That is, the molded body 11 may be conveyed and shaped in a state where the molded body 11 is closer to any one of the widthwise ends of the conveying device 12. In the above-described case, the magnitude of an appropriate load may be different between both of the longitudinal ends of the smoother plate 101. As described above, a glass plate has been hitherto used as the smoother plate. Thus, there has been difficulty in adjusting the magnitude of the load at the left- and right-hand sides of the smoother plate.

Meanwhile, the smoother 10 of the present embodiment controls the positions of the weights 104 on the arms supporting the smoother plate 101, thereby adjusting the load to apply to the smoother plate 101. As described above, the first control device 221 may control the weight 1041 and the weight 1042 independently of each other. Therefore, according to the smoother 10 of the present embodiment, it is also possible to individually control the magnitude of the load at the longitudinal ends of the smoother plate 101.

The first control device 221 of the smoother of the present embodiment preferably controls the positions of the weights 104 on the two arms 102 independently of each other in accordance with the position of the molded body 11 in the widthwise direction of the conveying device 12 conveying the molded body 11. By performing the above-described control, it is possible to apply an appropriate load to each of the left- and right-hand sides of the smoother plate 101, and especially to smooth the surface of the molded body 11.

For example, when the position of the molded body 11 in the widthwise direction of the conveying device 12 is defined by manufacturing conditions (control conditions) for the molded body 11 stored in the storage device 23, the position of the molded body 11 can be determined based on such manufacturing conditions. Also, if necessary, by providing a sensor configured to detect the position of the molded body 11 on the conveying device 12, the position of the molded body 11 may be determined from detection results obtained by such a sensor. Based on the position of the molded body 11 in the widthwise direction of the conveying device 12, the first control device 221 can calculate appropriate positions of the weights 104 on the arms 102 independently of each other, and control the positions of the weights 104 via the weight position changing device 105.

Note that, even if the center line CL11 of the molded body 11 in the widthwise direction thereof and the center line CL12 of the conveying device 12 in the widthwise direction thereof coincide with each other, the magnitude of an appropriate load may be different between the longitudinal ends of the smoother plate 101. Therefore, even if the CL11 and the CL12 coincide with each other, the first control device 221 may control the positions of the weights 104 on the two arms 102 independently of each other, if necessary.

No particular limitation is imposed on the configuration of the first control device 221. The first control device 221 can include a CPU (Central Processing Unit), a main storage device, an auxiliary storage device, an input-output interface, and the like, so as to calculate appropriate positions of the weights 104 on the arms 102 and communicate with the weight position changing device 105. Examples of the main storage device include a RAM (Random Access Memory), a ROM (Read Only Memory), and the like, and examples of the auxiliary storage device include a SSD (Solid State Drive), a HDD (Hard Disk Drive), and the like. Examples of the input-output interface include a communication interface configured to communicate a control signal and data with the weight position changing device 105 and the like. No particular limitation is imposed on the type of the communication interface. The communication interface can use a way to perform communication by wire or wirelessly, and examples thereof include a wired LAN (Local Area Network), a wireless LAN, and the like.

Note that, the storage device 23 may be configured with the above-described auxiliary storage device, and configured integrally with the first control device 221.

FIG. 2 illustrates the first control device 221 as the single control device 22 together with a second control device 222 as described below. Such an embodiment is by no means a limitation. The first control device 221 may be configured as a control device separate from the second control device 222 as described below.

The above-described input-output device 24 may be connected to the control device 22. No particular limitation is imposed on the configuration of the input-output device 24. However, for example, the input-output device 24 can include a user interface such as a touch panel, a keyboard, a display screen, an operation button, and the like, so that a user can input predetermined conditions or the like.

(1-7) Smoother Plate Position Changing Device, Second Control Device

The smoother 10 of the present embodiment may further include a smoother plate position changing device 106 and the second control device 222.

The smoother plate position changing device 106 is configured to change the position of the smoother plate in the height direction thereof.

The second control device 222 is configured to change the position of the smoother plate 101 in the height direction thereof via the smoother plate position changing device 106.

The smoother plate position changing device 106 may be a given device as long as the device is configured to change the positions of the arms 102 in the height direction thereof. No particular limitation is imposed on the configuration thereof. For example, the smoother plate position changing device 106 can be configured with an air cylinder, an oil cylinder (hydraulic cylinder), or the like.

The smoother plate position changing device 106 can be provided to each of the arms 102. As illustrated in FIG. 1, the arm 1021 can be provided with a smoother plate position changing device 1061 and the arm 1022 can be provided with a smoother plate position changing device 1062.

As described above, the second control device 222 can be provided as the single control device 22 together with the first control device 221, or can be provided separately from the first control device 221. The second control device 222 can have a similar configuration to the configuration of the first control device, and thus description thereof is omitted here.

No particular limitation is imposed on contents of control of the position of the smoother plate 101 in the height direction thereof via the smoother plate position changing device 106 by the second control device 222.

For example, when the smoother 10 includes a debris detection sensor 107, the second control device 222 can move the smoother plate 101 upward, i.e., in a direction away from the molded body 11 along the Z-axis direction, based on detection results obtained by the debris detection sensor 107 (ascending step). Specifically, in response to the debris detection sensor 107 detecting that the debris adheres to a lateral surface 101S of the smoother plate 101, the second control device 222 can move the smoother plate 101 upward. Note that, as illustrated in FIG. 1, the lateral surface 101S of the smoother plate 101 means a lateral surface of the smoother plate 101 positioned upstream in the conveying direction of the molded body 11, e.g., a lateral surface disposed to face an unillustrated molding machine.

After the ascending step, if necessary, the debris adhered to the lateral surface 101S of the smoother plate 101 can be removed automatically or manually. After confirming, visually or by a sensor, that no debris adheres to the lateral surface 101S of the smoother plate 101, the second control device 222 can descend the smoother plate 101 automatically or by an input from the input-output device 24 (descending step). Then, it is possible to resume a smoothing treatment of the surface of the molded body 11. Note that, after a certain time has passed after ascending of the smoother plate 101, the second control device 222 may control the smoother plate 101 so as to descend.

When the smoother plate position changing device 106 is configured with a cylinder device such as an air cylinder, a rod 106A of the smoother plate position changing device 106 can be kept contracted until the ascending step, as illustrated in FIG. 2. Specifically, for example, the rod 106A of the smoother plate position changing device 106 can be kept without contact with the arm 102. During the ascending step or the descending step, the rod 106A portion of the smoother plate position changing device 106 can be elongated from the above-described contracted state to contact the arm 102, thereby controlling the position of the smoother plate 101 in the height direction thereof via the arm 102.

No particular limitation is imposed on the position to which the smoother plate 101 is moved upward in the above-described ascending step. However, for example, the smoother plate 101 can be ascended to a predetermined retracted position. Then, after completion of the descending step, the smoother plate 101 can be descended to such a position that the smoother plate 101 can perform the smoothing treatment of the surface of the molded body 11. As illustrated in FIG. 2, after completion of the descending step, the rod 106A can be contracted to achieve a state where the rod 106A of the smoother plate position changing device 106 is not in contact with the arm 102.

Note that, contents of control of the position of the smoother plate 101 in the height direction thereof via the smoother plate position changing device 106 by the second control device 222 are not limited to the above-described embodiment.

Because the smoother 10 of the present embodiment is a device configured to smooth the surface of the molded body 11 molded with a molding machine, the smoother 10 is disposed downstream of the molding machine in the conveying direction of the molded body 11 and the like. Thus, the second control device 222 may be configured to control the position of the smoother plate 101 in coordination with the molding machine.

Specifically, for example, when the molding machine ascends or descends, the second control device 222 can ascend or descend the smoother plate 101 in coordination therewith. Note that, as illustrated in the gypsum board manufacturing device 30 of FIG. 3 as described below, ascending of an upper horizontal plate 371 of the molding machine 37 ascends the smoother plate 101. Also, descending of the upper horizontal plate 371 of the molding machine 37 descends the smoother plate 101. The distance over which the smoother plate 101 ascends or descends can be selected, for example, based on the movement of the molding machine, and based on the control conditions that are stored in the storage device 23 and are predetermined in accordance with the product type of the molded body 11. At this time, the above-described first control device 221 may also change the positions of the weights 104 on the arms 102 via the weight position changing device 105.

Contents of control of the second control device 222 are not limited to the above embodiment. For example, the position of the smoother plate 101 may be controlled so as to ascend or descend based on an input from the input-output device 24.

(1-8) Debris Detection Sensor

The smoother 10 may include the debris detection sensor 107.

In this case, as described above, in response to the debris detection sensor 107 detecting that the debris adheres to the lateral surface 101S of the smoother plate 101 positioned upstream in the conveying direction of the molded body 11, the above-described second control device 222 can move the smoother plate 101 upward by the smoother plate position changing device 106.

The molded body 11, which is being conveyed, is usually formed through molding in an unillustrated molding machine or the like, and conveyed by the conveying device 12 to a region where the smoother 10 of the present embodiment is disposed. However, the debris may adhere to the surface of the molded body upon molding with the molding machine or during the conveyance from the molding machine, and the debris may also adhere to the lateral surface 101S of the smoother plate 101. When the surface of the molded body 11 is levelled and smoothed by the smoother 10 in a state where the debris adheres to the lateral surface 101S of the smoother plate 101, there is a risk that a recessed portion is formed by the debris in the surface of the molded body 11.

In view thereof, the smoother 10 of the present embodiment can include the debris detection sensor 107.

No particular limitation is imposed on the position at which the debris detection sensor 107 is attached. The debris detection sensor 107 may be attached at a given position as long as the debris detection sensor 107 can monitor and detect adherence of the debris to the lateral surface 101S of the smoother plate 101. Note that, the adherence of the debris to the lateral surface 101S of the smoother plate 101 also includes deposition of the debris on the lateral surface 101S, the debris being caught therein, and the like.

The debris detection sensor 107 can be provided to, for example, the arms 102. Specifically, the arm 1021 can be provided with a transmitter 1071 of the debris detection sensor and the arm 1022 can be provided with a receiver 1072 of the debris detection sensor. When a signal from the transmitter 1071 is blocked by the debris and cannot be received by the receiver 1072, it can be determined that the debris adheres to the lateral surface 101S of the smoother plate 101.

When it is determined that the debris adheres to the lateral surface 101S of the smoother plate 101, the second control device 222 can move the smoother plate 101 upward, i.e., in a direction away from the molded body 11 along the Z-axis direction, by the smoother plate position changing device 106 (ascending step).

Note that, after the ascending step, if necessary, the above-described descending step and the like can be performed.

By performing the above-described control, it is possible to prevent formation of a recessed portion in the surface of the molded body 11 due to the debris adhered to the lateral surface 101S of the smoother plate 101.

After performing the above-described control, if necessary, the input-output device 24 may issue an alarm, or after a certain time has passed, the smoothing treatment of the surface of the molded body 11 may resume.

No particular limitation is imposed on the configuration of the debris detection sensor 107. For example, an infrared sensor or the like can be used.

(1-9) Smoother Plate Position Measurement Device

If necessary, the smoother 10 may include a smoother plate position measurement device 21 (see FIG. 2).

When the smoother plate position measurement device 21 measures the position of the smoother plate 101, it is also possible to measure an approximate thickness of the molded body 11 to manufacture.

FIG. 2 illustrates an example of a device including the contact-type smoother plate position measurement device 21 disposed in a region where the molded body 11 does not pass, and being configured to detect the position by contacting the contact-type smoother plate position measurement device 21 with the smoother plate 101 from below the smoother plate 101. However, the smoother plate position measurement device 21 may be a given unit as long as the unit is configured to measure the position of the smoother plate 101. No particular limitation is imposed on the configuration thereof. The smoother plate position measurement device 21 may be a contact-type position measurement device or may be, for example, a contactless position measurement device using a laser or the like.

Although the configuration of the smoother of the present embodiment has been described above taking as an example the smoother 10 as illustrated in FIG. 1 and FIG. 2, the smoother of the present embodiment may include a plurality of, e.g., two or three smoothers 10 as illustrated in FIG. 1 and FIG. 2 along the conveying direction of the molded body 11. When the case of including the plurality of smoothers 10 in this manner is distinguished, the smoother including the plurality of smoothers 10 may be referred to as a multi-step smoother or the like.

The molded body 11 applied to the smoother 10 of the present embodiment will be described.

(2) Molded Body

No particular limitation is imposed on, the type of the molded body 11 whose surface is to be smoothed by the smoother 10 of the present embodiment. The molded body 11 obtained through molding of various materials forming surfaces that need leveling and smoothing can be applied to the smoother 10 of the present embodiment.

As described above, no particular limitation is imposed on the molded body 11 whose surface is to be smoothed by the smoother 10 of the present embodiment. However, examples thereof include the molded body 11 required to have a plate shape, and a molded body of a gypsum slurry for manufacturing a gypsum board and the like.

Examples of the molded body 11 of the gypsum slurry include glass mat gypsum boards, plates containing glass fiber nonwoven fabric-containing gypsum, gypsum boards stipulated in JIS A 6901 (2014), gypsum boards that are lighter or heavier than the gypsum boards stipulated in JIS A 6901 (2014), molded bodies of gypsum slurries used for manufacturing, for example, slag gypsum plates, and the like.

The molded body of the gypsum slurry is used as building materials for various buildings, and often varies in sizes and the like intended for manufacturing. As described above, only by changing the positions of the weights 104 on the arms 102, the smoother 10 of the present embodiment can change a load to apply to the molded body by the smoother plate 101 and can apply an appropriate load to the molded body 11. Therefore, according to the smoother 10 of the present embodiment, it is possible to respond to a larger number of types of molded bodies in terms of a width, product types, and the like, compared to the existing smoothers. Thus, when molded bodies of gypsum slurries varying in sizes and the like are manufactured, the smoother of the present embodiment can achieve higher manufacturing efficiency compared to the existing smoothers, and can exhibit especially high effects.

[Gypsum Board Manufacturing Device]

A configuration example of the gypsum board manufacturing device of the present embodiment will be described with reference to FIG. 3.

As illustrated in FIG. 3, the gypsum board manufacturing device 30 can include: a mixer 34 configured to form a gypsum slurry; the molding machine 37 configured to mold the gypsum slurry supplied from the mixer; and the smoother 10 configured to smooth the surface of a molded body molded with a molding machine.

In the gypsum board manufacturing device 30, a lower paper sheet 31, i.e., a board liner, is conveyed along an arrow D from the right-hand side to the left-hand side in the drawing. The mixer 34 can be disposed near a conveying line of the lower paper sheet 31. Calcined gypsum, water, and an adhesion aid, which are raw materials of the gypsum slurry, and additives such as a hardening accelerator, an admixture, foams, a foaming agent, and the like are supplied to the mixer 34 through a conduit 341, followed by kneading with the mixer 34, and a gypsum slurry can be prepared. Note that, FIG. 3 illustrates only one conduit 341; however, in accordance with, for example, the number of raw materials to be supplied, the raw materials of the gypsum slurry can be supplied to the mixer 34 through a plurality of conduits. Also, the raw materials of the gypsum slurry may be supplied to the mixer 34 after a part thereof has been mixed.

A gypsum slurry 35 obtained through kneading with the mixer 34 can be supplied onto the lower paper sheet 31 through a conduit 342. Note that, FIG. 3 illustrates only one conduit 342; however, if necessary, the gypsum slurry 35 may be supplied through a plurality of conduits. Also, if necessary, a part of the gypsum slurry 35 may also be supplied and applied to an upper paper sheet 32.

The lower paper sheet 31 travels on the conveying line together with the gypsum slurry 35, and widthwise edges of the lower paper sheet 31 are folded upward by unillustrated guide members. Also, the upper paper sheet 32 is fed onto the gypsum slurry 35 via a feed roller 33.

The lower paper sheet 31, the gypsum slurry 35, and the upper paper sheet 32 are stacked by upper and lower surface plates 36, and are supplied to the molding machine 37 as a continuous stacked body having a three-layered structure.

The molding machine 37 includes upper and lower horizontal plates 371 and 372. The lower horizontal plate 372 is horizontally fixed so as to horizontally convey the lower paper sheet 31. The upper horizontal plate 371 is disposed above the lower horizontal plate 372 with a gap therefrom.

The upper horizontal plate 371 is configured so that the position thereof can be changed by an ascending and descending driving device 373. When the ascending and descending driving device 373 controls the position of the upper horizontal plate 371 and adjusts the dimension of the height of a space formed between the horizontal plates 371 and 372, an appropriate molding pressure can be applied to the stacked body of the lower paper sheet 31, the gypsum slurry 35, and the upper paper sheet 32.

Downstream of the molding machine 37 in the conveying direction of the molded body, the above-described smoother 10 can be disposed. The smoother 10 levels and smooths the surface of the molded body, and can remedy deformation of the molded body such as swelling. Because the smoother 10 is already described, description thereof is omitted here.

Note that, the gypsum board manufacturing device 30 of the present embodiment may include a plurality of smoothers 10. In this case, the plurality of smoothers 10 can be disposed along the conveying direction of the molded body.

If necessary, the gypsum board manufacturing device of the present embodiment may further include a drying device, a cutting device, and the like.

While the smoother and the gypsum board manufacturing device have been described above by way of the embodiments and the like, the present invention is not limited to the above embodiments and the like. Various modifications and changes are possible within the scope of the gist of the present invention as recited in the claims.

The present application claims priority to Japanese Patent Application No. 2021-140653, filed Aug. 31, 2021, and the contents of Japanese Patent Application No. 2021-140653 are incorporated in the present international application by reference in their entirety.

DESCRIPTION OF THE REFERENCE NUMERAL 10 smoother
101 smoother plate
1018 lateral surface of the smoother plate (upstream in the conveying direction of the molded body)
102, 1021, 1022 arm
103A supporting shaft
104, 1041, 1042 weight
105, 1051, 1052 weight position changing device
106, 1061, 1062 smoother plate position changing device
107 debris detection sensor
11 molded body
12 conveying device
22 control device
221 first control device
222 second control device
23 storage device
30 gypsum board manufacturing device
34 mixer
35 gypsum slurry
37 molding machine

The invention claimed is:
1. A smoother configured to correct a shape of a molded body of a gypsum slurry by smoothing, the smoother comprising:
a conveying device for the molded body;
a pair of arms that are respectively disposed to face both widthwise ends of the conveying device, and in which longitudinal ends of the arms are swingable in upward and downward directions with respect to a conveying surface of the conveying device;

a smoother plate having a plate-shaped body and being fixed to a pair of facing ends of the longitudinal ends of the pair of arms, the smoother plate configured to contact and smooth a top surface of the molded body with a bottom surface of the plate-shaped body as the molded body is being conveyed under the bottom surface on the conveying surface;

weights that are respectively attached to the pair of arms and are movable along a longitudinal direction of the arms;

a weight position changing device configured to change positions of the weights on the arms; and a first control device configured to control the positions of the weights on the arms via the weight position changing device.

2. The smoother according to claim 1, wherein the smoother includes a smoother plate position changing device configured to change a position of the smoother plate in a height direction thereof, and a second control device configured to change the position of the smoother plate in the height direction thereof via the smoother plate position changing device.

3. The smoother according to claim 2, wherein the smoother includes a debris detection sensor, and the second control device is configured to move the smoother plate upward by the smoother plate position changing device in response to the debris detection sensor detecting that a debris adheres to a lateral surface of the smoother plate positioned upstream in a conveying direction of the molded body.

4. The smoother according to claim 1, further comprising a storage device, wherein the first control device is configured to control the positions of the weights on the arms based on control conditions in accordance with a type of the molded body stored in the storage device.

5. The smoother according to claim 1, wherein the first control device is configured to control the positions of the weights on the arms independently of each other in accordance with a position of the molded body in a widthwise direction of the conveying device.

6. A gypsum board manufacturing device, comprising:

a mixer configured to form a gypsum slurry;

a molding machine configured to mold the gypsum slurry supplied from the mixer; and the smoother according to claim 1, the smoother being configured to smooth a surface of a molded body molded with the molding machine.

* * * * *